INVENTOR
EGON E. LOEBNER
BY
Norman J. O'Malley
ATTORNEY

United States Patent Office 3,297,878
Patented Jan. 10, 1967

3,297,878
PHOTOSENSITIVE BISTABLE ELEMENT FOR USE IN INFORMATION STORAGE

Egon E. Loebner, Princeton, N.J., assignor, by mesne assignments, to Sylvania Electric Products Inc., Wilmington, Del., a corporation of Delaware

Filed Nov. 28, 1956, Ser. No. 624,862
6 Claims. (Cl. 250—213)

This invention relates generally to opto-electronic devices and more specifically to an opto-electronic bistable structure.

Bi-stable circuits using conventional receiving tubes or transistors are well known in the art and are used extensively for storage of pulse information in computers. More and more computer applications have space limitations calling for an extremely small package with a minimum of electrical coupling between input and output.

Thus, it is an object of this invention to provide information storage by opto-electronic means.

It is a further object of this invention to provide information storage which can be either optically read in or electrically read in and either optically read out or electrically read out.

It is still a further object of this invention to provide information storage in an extremely small package.

Briefly, in one aspect of the invention there is provided an electrically coupled light sensitive impedance means and an energizable light producing means which are also light coupled to each other and selected to have parameters providing a stable off condition and a stable excited condition. Signal actuated means may be used for initiating excitation of said light producing means and for returning the light producing means to the stable off condition.

Figure 1:
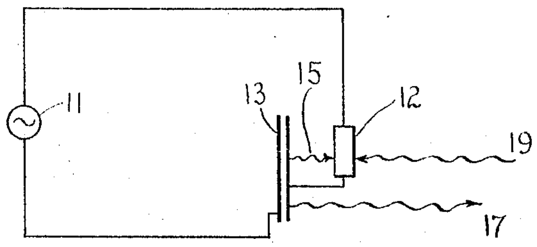

For a better understanding of the invention, together with other and further objects and capabilities thereof, reference is made to the following description and appended claims in connection with:

FIG. 1 showing an opto-electron element; and

Figure 2:
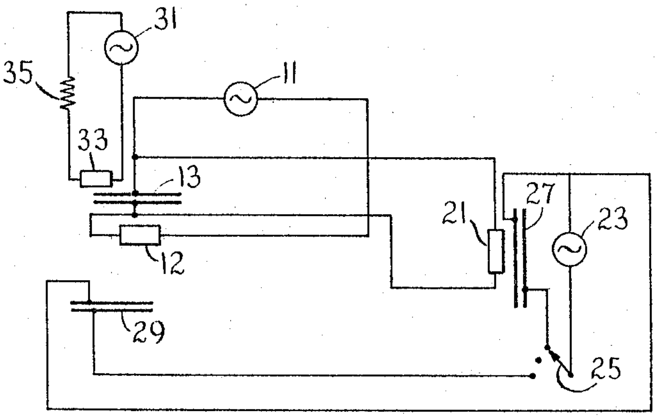

FIG. 2 showing one embodiment of a controlled opto-electronic bi-stable device.

In FIG. 1 there is shown an alternating current power source 11 connected across a light sensitive impedance means 12 and an energizable light producing means 13, preferably of the electroluminescent type. Light sensitive impedance means 12 may be a cadmium sulphide cell and the energizable light producing means 13 may be an electroluminescent area source comprising a dielectric suspension of phosphor particles as described in copending patent application Serial Number 306,909, filed August 28, 1952, now abandoned, by Norman L. Harvey and assigned to the assignee of this application.

As can be seen from the drawing, light sensitive means 12 and light producing means 13 are light coupled, this being indicated by the arrow 15. Light producing means 13 also produces an external light output 17, which as will be hereinafter seen, may be used to convey information.

The structure of FIG. 1 is normally in a stable off condition, i.e., the resistance of light sensitive means 12 is high enough to hold the voltage drop across light producing means 13 below the value at which element 13 luminesces. When an external light pulse is applied at 19, however, the resistance of the light sensitive impedance means or photosensitive means 12 is momentarily decreased, thereby raising the voltage applied across the light producing means or electroluminescent panel 13. This increase in voltage across panel 13 is sufficient to cause it to luminesce and the light fed back through the light coupling at 15 to the photosensitive means 12 holds the impedance of photosensitive means 12 at a low level.

It can be seen that the parameters of panel 13 and photosensitive means 12 may be selected to provide circuit stability regardless of whether the circuit is in the off condition or in the on condition.

A complete bi-stable device including the circuit of FIG. 1 is shown in FIG. 2, using the same reference numerals as used in FIG. 1 wherever applicable. In FIG. 2 power source 11 is again coupled across a series circuit comprising panel 13 and photosensitive means 12. A second photosensitive means 21 which may be called a signal actuated means is coupled directly across panel 13. Input power source 23 is coupled through a selector switch 25 which may be either mechanical, electronic, or any other type, to an input electroluminescent or light producing means 27. Power source 23 may also be coupled by means of switch 25 to another electroluminescent panel or lighting producing means 29. As will be hereinafter explained, power source 31 is coupled across a photosensitive means 33 in series with impedance 35 to provide an information readout circuit.

The circuit of FIG. 2, insofar as it resembles the circuit of FIG. 1, operates in the manner previously explained, i.e., so long as panel 13 in the extinguished condition, absent any external stimuli, the circuit remains in a stable off condition. If photosensitive means 12 is triggered into the low impedance condition through excitation of panel 29 through switch 25 from source 23, the excitation voltage across panel 13 is raised sufficiently to cause it to luminesce. Again panel 13 is light coupled to photosensitive means 12 so as to maintain the low impedance condition of photosensitive means 12 once the circuit is triggered into the on condition. To return the circuit to the stable off condition, switch 25 is turned to the position shown in the drawing to excite panel 27 which is light coupled to photosensitive means 21. Whereas photosensitive means 21, when not exposed to an external source of light, has a relatively high impedance and does not appreciably modify the voltage across panel 13, as soon as photosensitive device is illuminated, its internal impedance drops to lower the excitation voltage across panel 13. Panel 13 is thus extinguished and the circuit is returned to the stable off position.

If desired, a light coupled readout circuit may be utilized comprising power source 31, photosensitive means 33 and impedance 35. Photosensitive means 33 is light coupled to panel 13 and thus light output from panel 13 is capable of reducing the impedance of photosensitive device 33 and increasing current flow through impedance 35. Impedance 35 may be a simple load resistor across which an electrical signal may be extracted, or it may comprise the load resistance of the ultimate utilization device.

The cadmium sulphide photosensitive elements used in the structure of FIG. 2 may be of extremely small size. The electroluminescent panels 13, 27 and 29 may also be of extremely small size and thus the complete unit lends itself to the solution of computer packaging problems which may be very difficult to solve with conventional tube or transistor circuitry. Further, it is to be noted that the input and output of the bi-stable device are completely electrically isolated from each other. Read-in information storage and read-out circuitrv are solely light or optically coupled.

While there has been shown and described what is at present considered the preferred embodiment of the invention, it will be apparent to those skilled in the art that various changes and modifications may be made therein without departing from the invention as defined by the appended claims.

Having thus described the invention, I claim:

1. An opto-electronic bi-stable device comprising the combination of an electrically series coupled voltage source, a light sensitive impedance means and an energizable light producing means, said light sensitive means and said light producing means being light coupled and having parameters providing a stable off condition and a stable excited condition, signal actuated means coupled across said light producing means for lowering the voltage applied thereto to return said light producing means to the stable off condition from the excited condition.

2. An opto-electronic bi-stable device of the type claimed in claim 1 wherein the signal actuated means comprises a second light sensitive impedance means.

3. An opto-electronic bi-stable device comprising the combination of an electrically series coupled power source, a light sensitive impedance means and an energizable light producing means, said light sensitive impedance means and said light producing means being light coupled and having parameters providing a stable off condition and a stable excited condition, light actuated means coupled across said light producing means for returning said light producing means to the stable off condition and a light pulse source for illuminating said light actuated means.

4. An opto-electronic bi-stable device comprising the combination of an electrically series coupled power source, a light sensitive impedance means and an energizable light producing means, said light sensitive impedance means and said light producing means being light coupled and having parameters providing a stable off condition and a stable excited condition, light actuated means coupled across said light producing means for returning said light producing means to the stable off condition, input means light coupled to said light sensitive impedance means and said light actuated means, and output means light coupled to said light producing means.

5. An opto-electronic bi-stable device comprising the combination of an electrically series coupled power source, a light sensitive impedance means and an energizable light producing means, said light sensitive impedance means and said light producing means being light coupled to provide a stable off condition and a stable excited condition, signal actuated means for decreasing the impedance of said light sensitive impedance means to change said light producing means from the stable off condition to the stable on condition and for increasing the impedance of said light sensitive impedance means to change said light producing means back to the stable off condition.

6. In an opto-electronic bi-stable device the combination comprising a light sensitive impedance means and an electroluminescent panel connected in series across a power source; said light sensitive impedance means and said electroluminescent panel being light coupled and selected to have parameters providing a stable off condition and a stable excited condition; signal actuated conduction means electrically coupled across said electroluminescent panel for returning said electroluminescent panel from the stable excited condition to the stable off condition.

References Cited by the Examiner

UNITED STATES PATENTS

| | | | |
|---|---|---|---|
| 2,080,926 | 5/1937 | Penning et al. | 250—211 |
| 2,193,789 | 3/1940 | Braselton | 250—205 |
| 2,727,683 | 12/1955 | Allen et al. | 250—217 |
| 2,743,430 | 4/1956 | Schultz et al. | 250—212 |
| 2,765,986 | 10/1956 | Pompetti et al. | 250—205 X |
| 2,805,360 | 9/1957 | McNaney | 250—213 |
| 2,818,511 | 12/1957 | Ullery et al. | 250—211 |
| 2,838,719 | 6/1958 | Chitty | 250—217 |
| 2,985,763 | 5/1961 | Ress | 250—208 |

OTHER REFERENCES

Mellon Institute of Industrial Research, "Optical Storage Cells and Switches," Quarterly Review #3, Fellowship on Computer Components #347, pp. 1–4 cited; pp. 1–4 relied upon.

RALPH G. NILSON, *Primary Examiner.*

ELI J. SAX, RICHARD M. WOOD, MAX L. LEVY, *Examiners.*

V. LAFRANCHI, B. A. GILHEANY, R. K. SCHAEFER, E. S. STRICKLAND, W. STOLWEIN, *Assistant Examiners.*